(12) United States Patent
Banks (10) Patent No.: US 6,344,070 B1
(45) Date of Patent: Feb. 5, 2002

(54) SELECTIVE ADSORPTION OF COMPONENTS OF A GAS MIXTURE

(75) Inventor: Robert Banks, Winchester (GB)

(73) Assignee: Domnick Hunter Ltd, Birtley (GB)

( * ) Notice: Subject to any disclaimer, the term of this patent is extended or adjusted under 35 U.S.C. 154(b) by 0 days.

(21) Appl. No.: 09/530,510

(22) PCT Filed: Oct. 30, 1998

(86) PCT No.: PCT/GB98/03228

§ 371 Date: Jun. 26, 2000

§ 102(e) Date: Jun. 26, 2000

(87) PCT Pub. No.: WO99/22846

PCT Pub. Date: May 14, 1999

(30) Foreign Application Priority Data

Nov. 1, 1997 (GB) ............................................. 9723033

(51) Int. Cl.[7] ............................................. B01D 53/047
(52) U.S. Cl. ........................... 95/98; 95/105; 95/138; 95/139; 96/130; 96/144; 426/419
(58) Field of Search .................. 95/96–98, 100–105, 95/130, 138; 96/130, 144; 426/418, 419

(56) References Cited

U.S. PATENT DOCUMENTS

| | | | | |
|---|---|---|---|---|
| 3,564,816 A | * | 2/1971 | Batta ........................ | 95/130 X |
| 3,957,463 A | * | 5/1976 | Drissel et al. ............. | 95/130 X |
| 4,013,429 A | * | 3/1977 | Sircar et al. .............. | 95/130 X |
| 4,359,328 A | * | 11/1982 | Wilson ...................... | 95/130 X |
| 4,415,340 A | * | 11/1983 | Knoblauch et al. ........ | 95/138 X |
| 4,440,548 A | * | 4/1984 | Hill ........................... | 95/138 X |
| 4,566,282 A | * | 1/1986 | Knoblauch et al. ..... | 426/419 X |
| 4,589,888 A | * | 5/1986 | Hiscock et al. ........... | 95/130 X |
| 4,599,094 A | * | 7/1986 | Werner et al. ............ | 95/130 X |
| 4,740,378 A | * | 4/1988 | Jameson .................... | 426/419 |
| 4,829,774 A | * | 5/1989 | Wassibauer et al. .... | 426/419 X |
| 4,857,086 A | | 8/1989 | Kawai | |
| 4,948,391 A | | 8/1990 | Noguchi | |
| 4,961,322 A | * | 10/1990 | Oguma et al. .......... | 426/419 X |
| 5,328,503 A | * | 7/1994 | Kumar et al. ............. | 95/130 X |
| 5,346,536 A | * | 9/1994 | Kaneshige et al. ....... | 95/138 X |
| 5,411,578 A | * | 5/1995 | Watson et al. ............ | 95/130 X |
| 5,441,558 A | * | 8/1995 | Lee et al. ................. | 95/138 X |
| 5,451,248 A | * | 9/1995 | Sadkowski et al. ...... | 95/138 X |
| 5,968,223 A | * | 10/1999 | Rouge et al. ............. | 95/130 X |
| 6,113,671 A | * | 9/2000 | Garrett ..................... | 95/130 X |

FOREIGN PATENT DOCUMENTS

| | | |
|---|---|---|
| EP | 0 120 271 A1 | 10/1984 |
| EP | 0 332 724 A1 | 9/1989 |
| EP | 0 342 877 A2 | 11/1989 |
| EP | 0 567 852 A2 | 11/1993 |

* cited by examiner

Primary Examiner—Robert H. Spitzer
(74) Attorney, Agent, or Firm—Workman, Nydegger & Seeley (57) ABSTRACT

A method of removing individual gas components of a mixture of gases within a controlled environment container uses apparatus which comprises first and second chambers which are arranged in parallel for the gas mixture to flow through them from their inlet ends to their outlet ends. The chambers contain adsorbent material with different affinities for the gas components of the mixture. The method comprises supplying the gas mixture to the first chamber so as to pressurize it while allowing a purge stream to flow from the outlet end of the first chamber to the second chamber to purge adsorbed gas from the adsorbent material in the second chamber. A purge pulse of gas is then supplied from the outlet end of the first chamber to the second chamber to purge adsorbed gas from the adsorbent material in the second chamber, the rate of flow of the purge stream being less than that of the purge pulse.

17 Claims, 5 Drawing Sheets

SELECTIVE ADSORPTION OF COMPONENTS OF A GAS MIXTURE

BACKGROUND OF THE INVENTION

This invention relates to a method of removing individual ones of a mixture of gases within a controlled environment container and to apparatus for selectively adsorbing components of a gas mixture.

PRESENT STATE OF THE ART

Adsorbent materials can be used to change the composition of a mixture of gases by selective adsorption, using a material which has different tendencies to adsorb different components of the mixture. For example, nitrogen can be generated by selective adsorption of oxygen from air, -or by adsorbing nitrogen and then desorbing the adsorbed gas for collection.

It can be desirable to adjust the content in a mixture of gases of two or more of the components. For example, the storage life of perishable goods within a transportation container can be affected by the amounts of oxygen and of carbon dioxide in the environment within the container.

It is known to use twin adsorbent chambers to separate components of a gas mixture. The adsorbent in the chambers adsorbs one of the components of the mixture preferentially relative to another of the components. Apparatus which comprises two adsorbent chambers allows the adsorbent in one of the chambers to be used for separation while the adsorbent in the other of the chambers is regenerated by passage through it of a purge stream of gas supplied from the outlet of the chamber that is in use for separation.

BRIEF SUMMARY OF THE INVENTION

The present invention provides a technique for separating components of a mixture of gases in which the purge gas is supplied from the chamber that is in use for separation to the chamber that is to be regenerated in a pulse.

Accordingly, in one aspect, the invention provides a method of removing individual gas components of a mixture of gases within a controlled environment container using apparatus which comprises first and second chambers which are arranged in parallel for the gas mixture to flow through them from their inlet ends to their outlet ends and which contain adsorbent material with different affinities for the gas components of the mixture, the method comprising:

(a) supplying the gas mixture to the first chamber so as to pressurise it, while allowing a purge stream to flow from the outlet end of the first chamber to the second chamber to purge adsorbed gas from the adsorbent material in the second chamber, and (b) supplying a purge pulse of gas from the outlet end of the first chamber to the second chamber to purge adsorbed gas from the adsorbent material in the second chamber, the rate of flow of the purge stream being less than that of the purge pulse.

The method of the invention has the advantage that, by use of a purge pulse of gas from the first container to the second container, the efficiency which the components of the gas mixture can be separated can be increased. This can arise because of the use of the pulse of gas mixture which contains a relatively high proportion of the gas components for which the affinity of the adsorbent is least strong from the first chamber to purge adsorbed gas from the second chamber.

The purge stream and purge pulse will generally flow between the chambers through purge stream and purge pulse conduits, which may be separate or may be provided by a common conduit. Generally, at least one of the purge stream and the purge pulse, and preferably both, will be supplied to the second chamber at the outlet end thereof so that the flows of gas for adsorption and purge gas are countercurrent. When a common conduit is used, its capacity can be controlled by means of a valve which can be removed between first and second positions in which it accommodates the purge stream and the purge pulse respectively. Preferably, the ratio of the rate of flow of gas (measured in terms of weight of gas) in the purge pulse to that in the pulse stream is at least about 1.5, more preferably at least about 1.8, especially at least about 2.0. When the relative flow rates are achieved by different flow capacities in the purge stream and purge pulse conduits, it can be appropriate for the ratio of the capacity (volumetric) of the purge pulse conduit to that of the purge stream conduit to be at least about 1.5, preferably at least about 1.8, especially at least about 2.0. The ratio will generally be less than about 4.0, for example less than about 3.0.

The purge stream can flow from the outlet end of the first chamber to the second chamber substantially continuously while the pressure in the first chamber is greater than that in the second chamber. For example, when the purge stream flows through a purge stream conduit which connects the first and second chambers, it can contain an orifice valve. When a common conduit is used for the purge stream and the purge pulse, it might contain an orifice valve to control the rate of flow of the purge stream; that orifice valve might be capable of being opened to accommodate the flow of the purge pulse, or a by-pass section might be opened for the purge pulse.

Purged gas is discharged from the second chamber while one or both of the purge pulse and the purge stream is supplied to the second chamber. When the purge pulse or the purge stream are supplied at the outlet end of the second chamber, the purged gas will be discharged from the inlet end. The purged gas that is discharged from the second chamber can be vented to the controlled environment container from which the gas mixture is supplied to the apparatus. The invention can thus be used to increase the amount of the component of the gas mixture in the controlled environment container that is the dominant component in the purged gas. The component might be vented to another vessel when the method of the invention is used to purify that component. Alternatively or in addition, the purged gas that is discharged from the second chamber can be vented to atmosphere. A combination of venting to atmosphere and venting to the controlled atmosphere container can be appropriate when the identify of the dominant component of the purged gas changes as it flows.

Preferably, the method of the invention includes the step of venting the first chamber to discharge preferentially the component of the gas mixture for which the affinity of the adsorbent is least strong. The venting step will generally take place after the step of supplying a purge pulse of gas to the second chamber. The vented gas can be discharged to atmosphere when the method is used to reduce the amount of that component of the gas mixture in the controlled atmosphere container. The vented gas can be discharged to the container when the method is used to increase the amount of that component of the gas mixture in the controlled atmosphere container. The vented gas might be discharged to a vessel for storage when the method of the invention is used to purify that gas for collection. The technique provided by the present invention involving use of a pulse or purge gas has the advantage that it enhances the purity with which the least strongly adsorbed component or components of the gas mixture can be separated from the mixture. The invention thus provides an effective technique for purifying that component of the mixture.

The use of first and second chambers containing adsorbent allows the two quantities of adsorbent in the two chambers to be used for adsorption alternately, with one of the quantities being purged for reuse while the other is being used for adsorption. Preferably, the nature and configuration of the first chamber are substantially the same as those of the second chamber. Preferably, the adsorbent material contained within the first chamber is substantially the same as that within the second chamber. The method of the invention preferably includes the steps of equalising the pressures in the chambers and repeating the steps (a) to (d) referred to above with the respective functions of the first and second chambers reversed.

The duration of the steps of the method will be controlled according to factors including the relative proportions of the components in the gas mixture, the capacity of the adsorbent material in the chambers to adsorb selected ones of the components. For example, it can be preferred for the method to include a step of controlling the period for which the first chamber is vented to atmosphere to optimise venting of the component of the gas mixture for which the affinity of the adsorbent is least strong and retention by the adsorbent of the component of the gas mixture for which the affinity of the adsorbent is most strong. This can allow effective separation of the components of the gas mixture.

The adsorbent in the chambers can comprise a single material. It can be appropriate for there to be more than one adsorbent material in the chamber. The selection of adsorbent material will be made according to the nature of the components in the gas mixture and the adjustments that are required to the composition of the mixture.

Examples of suitable adsorbent materials which might be used in the present invention include activated alumina, silica based materials, zeolites and carbon based materials. Molecular sieve adsorbents will be appropriate for many applications. The high pressure oxygen adsorbent molecular sieve sold by UOP under the trade mark PSA $O_2$HP has been found to be particularly suitable for controlling the amounts of oxygen and carbon dioxide in a gas mixture consisting largely of nitrogen in addition to those gases. Adsorbent materials which have desiccant properties can be included in the chamber (with other adsorbent materials if appropriate) when the gas mixture includes moisture which should be removed. An example of a suitable desiccant material is an activated aluminium oxide.

In another aspect, the invention provides a twin bed adsorption apparatus for selectively adsorbing components of a gas mixture, which comprises first and second chambers arranged in parallel for the gas mixture to flow through them from their inlet ends to their outlet ends and which contain adsorbent material with different affinities for the gas components of the mixture, each of the chambers having (i) an inlet port for the gas mixture at its inlet end, (ii) an outlet port at its outlet end for discharge of the component of the gas mixture for which the affinity of the adsorbent is least strong, (iii) a purge outlet port for gas that is supplied to the chamber to purge gas adsorbed by the adsorbent, the apparatus including:

(a) a purge stream conduit for providing a purge stream of gas between the chambers when their internal pressures are different, from the outlet end of the chamber with a higher internal pressure to the chamber with a lower internal pressure, and (b) a purge pulse conduit for providing a purge pulse of gas from the outlet end of the chamber with a higher internal pressure to the chamber with a lower internal pressure, the capacity of the purge pulse conduit being significantly greater than the capacity of the purge stream conduit.

Preferably, the purge outlet ports are provided at the inlet ends of the chambers. Preferably, they are arranged so that the purge gas from the chambers can be directed to atmosphere or to a container from which the gas mixture is supplied to the apparatus.

Preferably, the apparatus includes a pressure equalisation conduit by which the chambers are connected, for example at their outlet ends, the pressure equalisation conduit including a two way valve by which the conduit can be opened for rapid equalisation of pressures in the chambers. During equalisation of the pressures in the chambers, the purge pulse conduit can be opened to increase the speed of the equalisation.

The technique of the invention can also involve the removal of components from a gas mixture by degradation. For example, the method of the invention can include a step of exposing the gas mixture to a treatment step which causes one or more components of the mixture to degrade. The step might involve for example the application of heat or pressure, or exposure to irradiation such as an electron beam or ultraviolet radiation. Exposure to ultraviolet radiation can be used to degrade hydrocarbon components of a gas mixture, especially ethylene. The apparatus of the invention can include an appropriate ultraviolet radiation source. Preferably, the apparatus includes appropriate heat exchanger components to allow waste heat from a compressor that is used to move gas within the controlled environment container to heat the gas mixture to be degraded. It is particularly preferred that the temperature of gas to be degraded by exposure to ultraviolet radiation be increased to enhance the degradation.

The adsorption technique provided by the present invention can be used to control the atmosphere in a container which might be used for transportation or storage or both of vulnerable materials. An example of an application might be for transportation and/or storage of perishable foodstuffs. The container might be transported by land (for example by road or by rail), sea or air. The invention is applicable to containers with a capacity of at least about 1000 litres, for example at least about $10^4$ litres, especially at least about $3 \times 10^4$ litres.

BRIEF DESCRIPTION OF THE DRAWINGS

The present invention will now be described, by way of example only, with reference to the accompanying drawings, in which.

DETAILED DESCRIPTION OF THE PREFERRED EMBODIMENT

Figure 1:
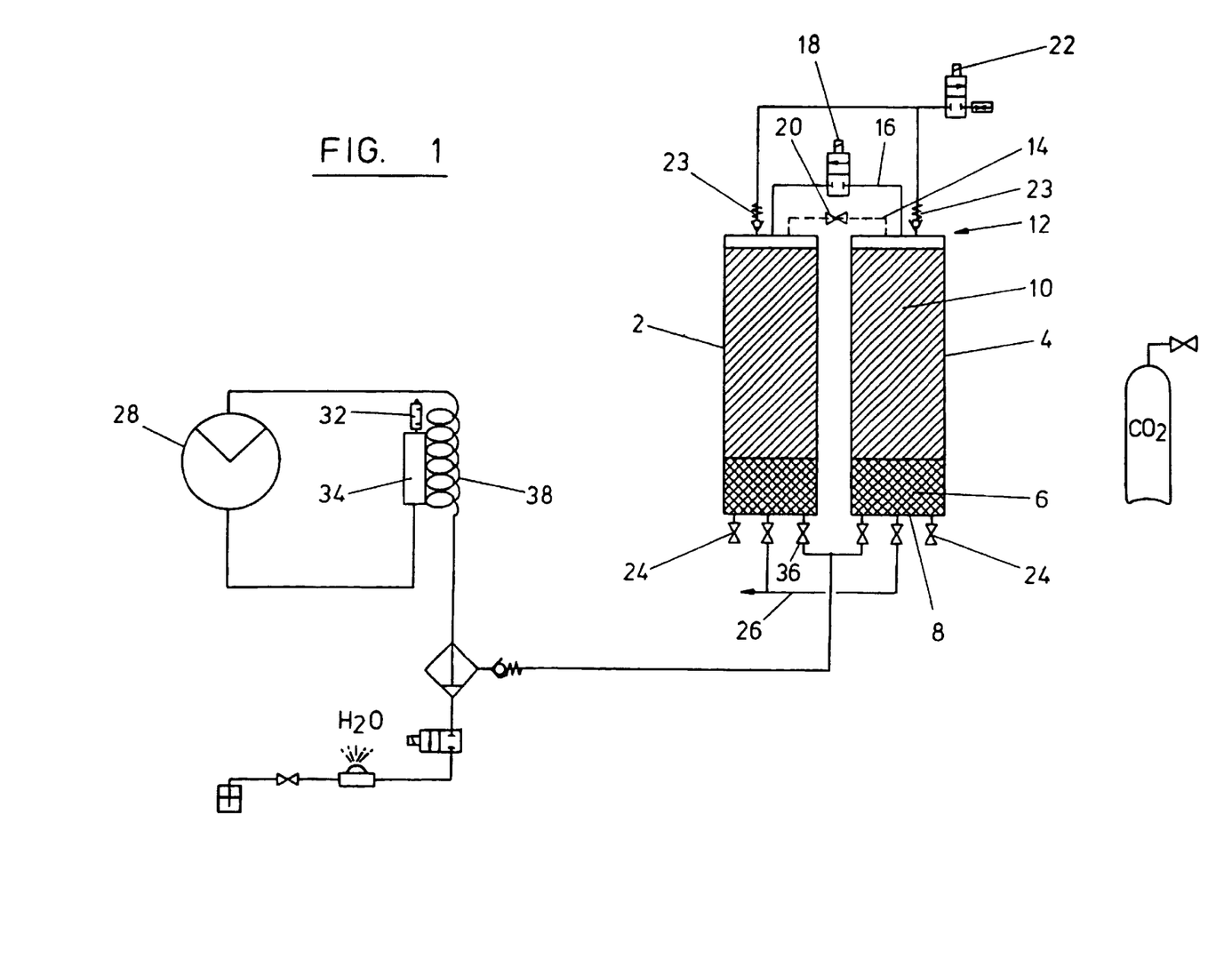
FIG. 1 is a schematic representation of apparatus for selectively adsorbing components of a gas mixture.

Referring to the drawings, the apparatus shown in FIG. 1 is intended for conditioning the gases in a controlled environment container such as might be used for transportation or storage of perishable goods, especially foodstuffs. The apparatus comprises first and second chambers 2, 4 which both contain a quantity 6 of an activated alumina desiccant towards their inlet ends 8 and a quantity 10 of a zeolite molecular sieve material towards their outlet ends 12.

At their outlet ends, the chambers are connected by means of a purge line 14 and a pressure equalisation line 16 with a valve 18. The purge line 14 contains a purge line valve 20 having an orifice size of about 3.1 mm² which allows a small quantity of gas to flow between the chambers when there is a pressure difference between them. The valve 18 in the pressure equalisation line 16 allows the pressures in the chambers to be equalised quickly.

The purge line valve 20 can be opened to increase the volumetric capacity of the purge line 14 by a factor of two so that a purge pulse of gas can flow between the first and second chambers when there is a pressure differential between them.

The discharge of gas from the outlet ends 12 of the chambers 2, 4 is controlled by means of an outlet valve 22. Non-return valves 23 are provided in the conduits from the outlet ends 12 of the chambers.

Purge gas outlets 24, 26 are provided at the inlet ends 8 of the chambers 2, 4 for gas to vent to atmosphere, and to the container from which the gas mixture to be separated was supplied to the apparatus, respectively.

Gas mixture is admitted to the apparatus through an inlet 32 and an ultraviolet scrubber 34, under force exerted by a compressor 28. The admission of the mixture to the apparatus is controlled by means of an admission control valve 36.

A heat exchanger 38 allows heat energy in gas from the compressor 28 to be transferred to the ultraviolet scrubber 34 so that gas that is exposed to ultraviolet radiation as it passes through the scrubber is heated, as disclosed in the specification of a copending patent application filed with the present application claiming priority from UK patent application no. 9723032.0, entitled GAS IRRADIATION TREATMENT and bearing agents' reference P11262WO. Subject matter incorporated in that document is incorporated in the specification of the present application by this reference.

Individual operations of the apparatus to remove components of a gas mixture will now be described in turn:

UV Scrubbing

With the admission valve 36 open, gas mixture is drawn into the apparatus through the inlet 32 by the action of the compressor 28. It is exposed to ultraviolet radiation with a wavelength of 185 nm as it passes through the ultraviolet scrubber 34. This leads to degradation of hydrocarbon components in the gas mixture, especially of ethylene.

The temperature of the gas mixture increases due to the action of the compressor. Passage of the heated gas through the heat exchanger 38 causes the temperature of the gas mixture passing through the scrubber to increase. This has been found to increase the efficiency of the degradation of ethylene contained in the gas mixture.

Ozone that is produced during the ultraviolet radiation step is converted to oxygen on passage through the adsorbent materials in the chambers during the oxygen or carbon dioxide removal steps (or both) described below.

The ultraviolet scrubber will suitably be arranged to operate while the compressor is admitting gases to the apparatus through the inlet 32.

Oxygen Removal

Referring to FIG. 2a which shows the columns 2, 4 of the apparatus shown in FIG. 1 with the chambers arranged so that the first chamber 2 is pressurised by a gas mixture containing oxygen and nitrogen while the second chamber 4 receives a purge stream from the first chamber 2 through the purge line 14. The purge stream is used to displace gas that has been adsorbed onto the adsorbent in the second chamber during a previous cycle. Purge gas is discharged from the second chamber to atmosphere through the purge gas outlet 24. During the pressurisation of the first chamber 2, nitrogen is adsorbed onto the molecular sieve material 10 and a pocket of oxygen accumulates towards the outlet end 12 of the chamber. The pressurisation step of the method might last for from about 10 to about 25 seconds, preferably from about 15 to about 20 seconds, for example about 17 seconds.

Once the pressure in the first chamber 2 has reached about $2 \times 10^5$ Pa (2 bar), the mode of the apparatus is switched to that shown in FIG. 2b in which the purge line valve 20 is opened, allowing increased flow of gas (oxygen in this case) that has collected at the top of the first chamber from the first chamber to the second chamber. Purged gas from the second chamber continues to be discharged into the controlled atmosphere through the purge gas outlet 24. This purge pulse step of the method might last for upto about 5 seconds, preferably upto about 3 seconds, for example about 2 seconds. The duration of the purge step will be selected according to the relative proportions of the components of the mixture. When the mixture consists largely of nitrogen and oxygen, the duration of the purge step might be varied as follows:

| $O_2$ (vol %) | Purge pulse (s) |
|---|---|
| 15–21% | 1 |
| 10–15% | 2 |
| 5–10% | 3 |
| <5% | 4 |

After the purge pulse step of the method, the mode of the apparatus is switched to that shown in FIG. 2c in which the purge line valve 20 is closed and the outlet valve 22 opened to allow accumulated oxygen at the top of the first chamber 2 to vent to atmosphere. The duration of the vent step is controlled according to the amount of oxygen that has collected in the first chamber: keeping the outlet valve open for too long will allow gas to escape which contains relatively low amounts of oxygen and relatively high amounts of nitrogen. The vent step might last for from about 10 to about 20 seconds, for example about 15 seconds.

After a suitable period for discharge of collected oxygen, the apparatus is prepared for regeneration of the adsorbent material in the first chamber by switching the mode of operation to that shown in FIG. 2d in which the outlet valve 22 is closed and the equalisation valve 18 is opened, allowing the pressures in the chambers to equalise. The pulse purge conduit can be opened during the equalisation step. The procedure described above for removing oxygen by operating the apparatus in the modes shown in FIGS. 2a to 2c can then be repeated to reduce the oxygen content of the gas mixture further, but with the second chamber 4 operating to remove oxygen and the purge gas flowing through the purge line 14 from the second chamber 4 to the first chamber 2.

Carbon Dioxide Removal

Figure 3:
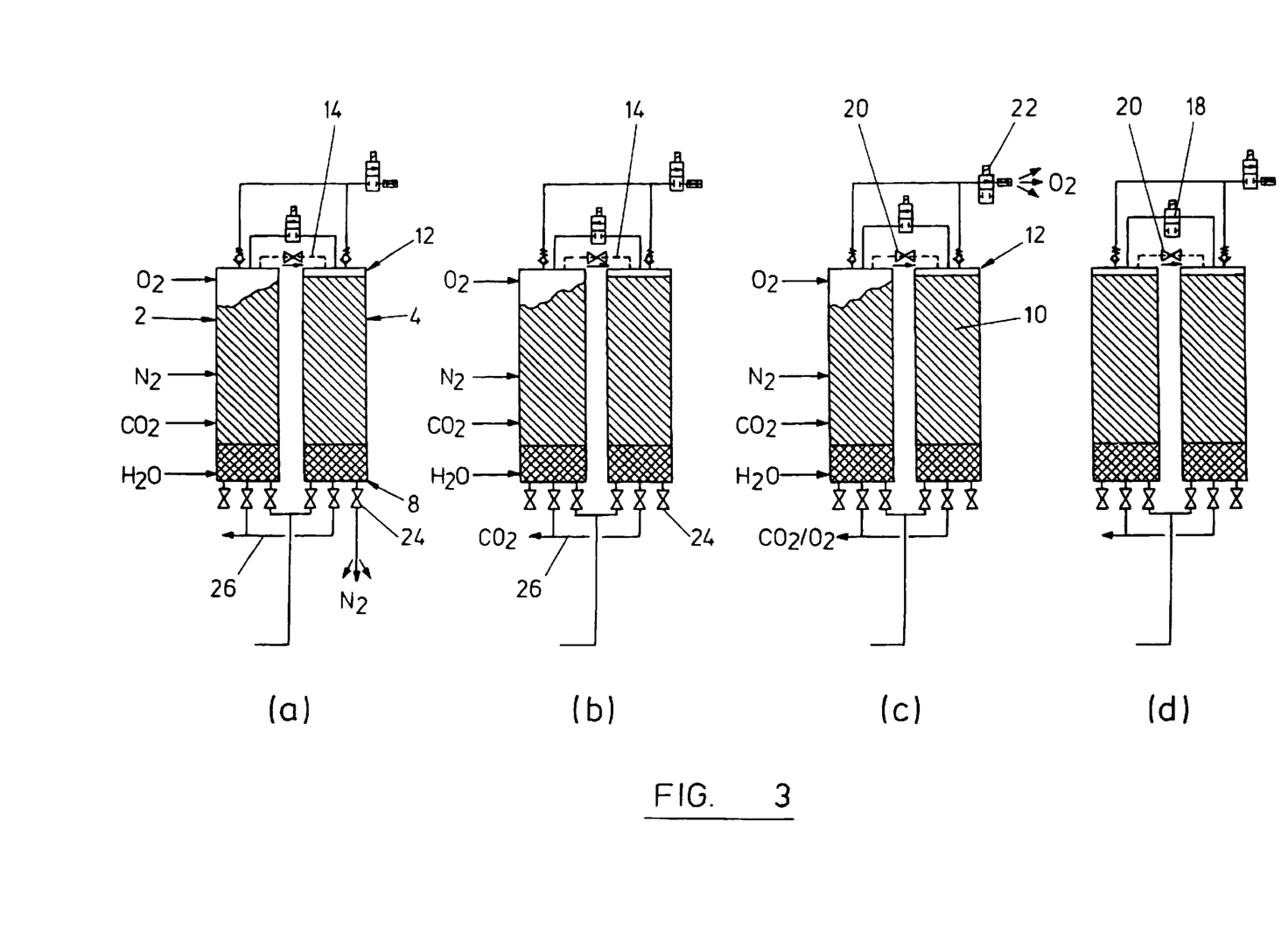
FIGS. 3a to 3d are schematic representations illustrating use of the apparatus shown in FIG. 1 to reduce the amounts of oxygen and carbon dioxide in an oxygen, carbon dioxide and nitrogen mixture.

Referring to FIG. 3a which shows the columns 2, 4 of the apparatus shown in FIG. 1 with the chambers arranged so that the first chamber 2 is pressurised by a gas mixture containing oxygen, carbon dioxide and nitrogen while the second chamber 4 receives a purge stream from the first chamber 2 through the purge line 14. The purge stream is used to displace gas that has been adsorbed onto the adsorbent in the second chamber during a previous cycle. Because of the relative strengths of the interactions between the adsorbent and nitrogen and carbon dioxide, the former tends to be displaced first. The apparatus is arranged so that the purge gas is discharged back into the controlled atmosphere container through the appropriate purge gas outlet 24 while the nitrogen dominates the purge gas stream, as shown in FIG. 3a.

When the carbon dioxide begins to dominate the purge gas stream, the purge gas is then diverted by reversing the purge gas outlet valves 24, 26, to cause the purge gas to vent to atmosphere, as shown in FIG. 3b.

During the pressurisation of the first chamber 2 when the apparatus has the configurations shown in FIGS. 3a and 3b, nitrogen is adsorbed onto the molecular sieve material 10 and a pocket of oxygen accumulates towards the outlet end 12 of the chamber, from which the purge gas flows through the purge gas line to the second chamber. This pressurisation step of the method might last for from about 10 to about 60 seconds, preferably from about 15 to about 30 seconds, for example about 20 seconds. The division of this period between the nitrogen venting to the container and carbon dioxide venting to atmosphere will depend on the relative proportions of the two gases that have been adsorbed in the second chamber.

Once the pressure in the first chamber 2 has reached about $2\times10^5$ Pa (2 bar), the mode of the apparatus is switched to that shown in FIG. 3c in which the purge line valve 20 is opened, allowing increased flow of gas (oxygen in this case) that has collected at the top of the first chamber from the first chamber to the second chamber. Purged gas from the second chamber continues to be discharged into the controlled atmosphere through the purge gas outlet 24. This purge pulse step of the method might last for up to about 5 seconds, preferably upto about 3 seconds, for example about 2 seconds.

After the purge pulse step of the method, the purge line valve 20 is closed. The outlet valve 22 can then be opened to allow accumulated oxygen at the top of the first chamber 2 to vent to atmosphere if it is desired to reduce the oxygen concentration in the controlled environment container.

After a suitable period for discharge of collected oxygen, the apparatus is switched to the mode of operation shown in FIG. 2d, as preparation for the regeneration of the adsorbent material in the first chamber.

It will be understood that the relative periods of operation of the apparatus, in its modes for removing oxygen and for removing carbon dioxide respectively, will be selected according to the desired adjustments to the composition of the gas mixture. The apparatus can be controlled by suitable control components, connected to gas compositions sensors in the controlled environment container.

EXAMPLE

Figure 2:
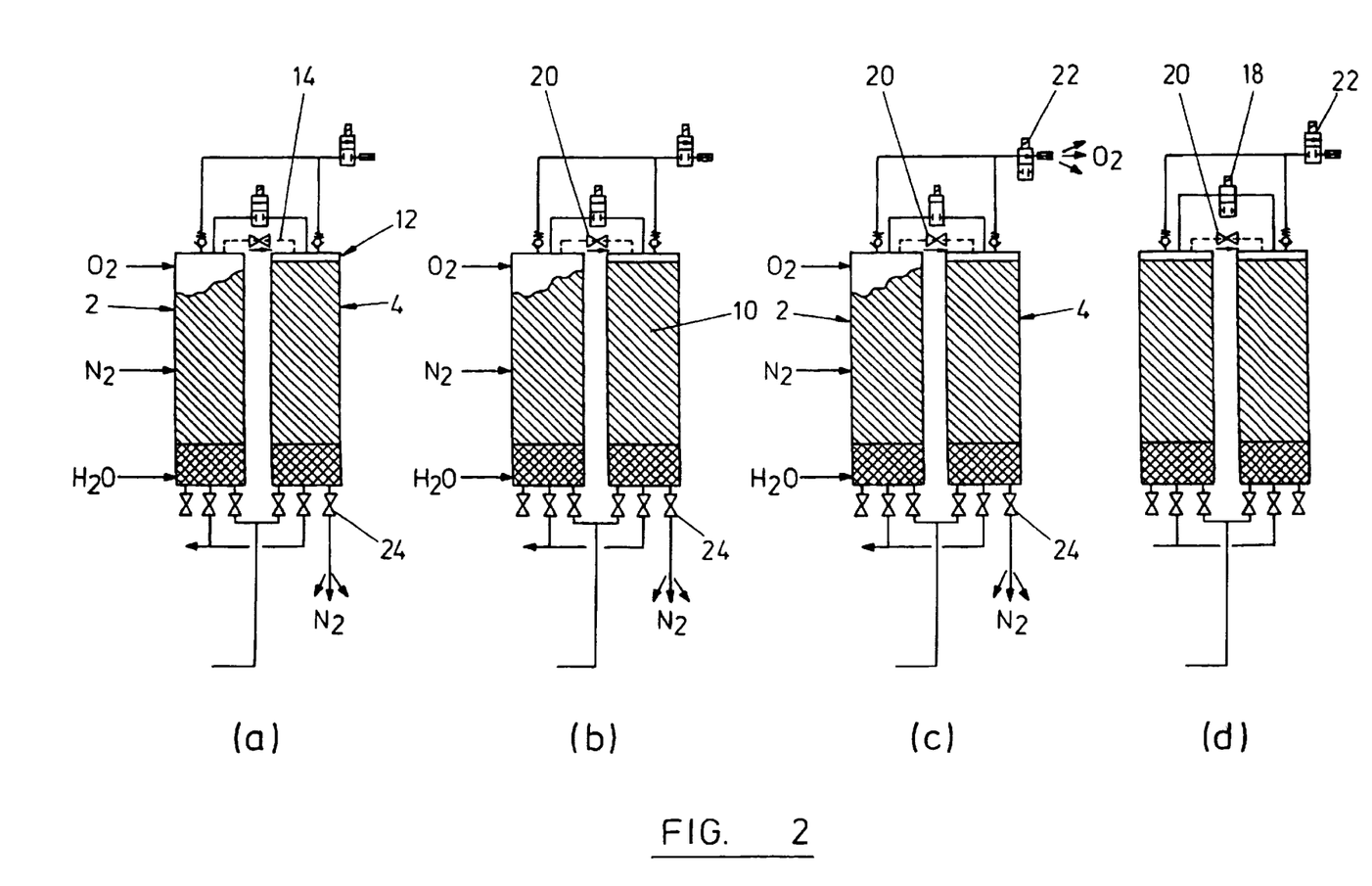
FIGS. 2a to 2d are schematic representations illustrating use of the apparatus shown in FIG. 1 to reduce the amount of oxygen in an oxygen-nitrogen mixture.

Apparatus as shown in FIGS. 1 and 2 was used to reduce the amount of oxygen in an oxygen-nitrogen mixture. The apparatus was used on an ISO reefer container having a length of about 12.3 m (40 feet) and a volume of about 60000 litres. The apparatus was used using two operating regimes. When operated in line with the technique provided by the present invention, the operating regime included a step of providing a purge pulse of gas between the chambers (as described above in the section of the description entitled "oxygen removal"). For the purposes of comparison, the apparatus was also operated without the step of providing the purge pulse.

In each mode of operation, the pressurisation and equalisation phases (as shown in FIGS. 2a and 2d respectively) had durations of 17 seconds. The intermediate phase(s) also lasted 17 seconds. In the case of the operating regime according to the invention, this included the provision of the purge pulse whose duration was adjusted according to the approximate concentration of oxygen in the mixture. The variation was as follows:

| $O_2$ (vol %) | Purge pulse (s) |
| --- | --- |
| 15–21% | 3 |
| 10–15% | 4 |
| 5–10% | 5 |
| <5% | 6 |

The pressures in the container at the beginning and end of each of these phases was approximately therefore as follows:

| | Pressure ($\times 10^5$ Pa) | |
| --- | --- | --- |
| Operating phase | start | End |
| Pressurisation | 1.4 | 2.2 |
| Intermediate | 2.2 | 2.8 |
| Equalisation | 2.8 | 1.4 |

Figure 4:
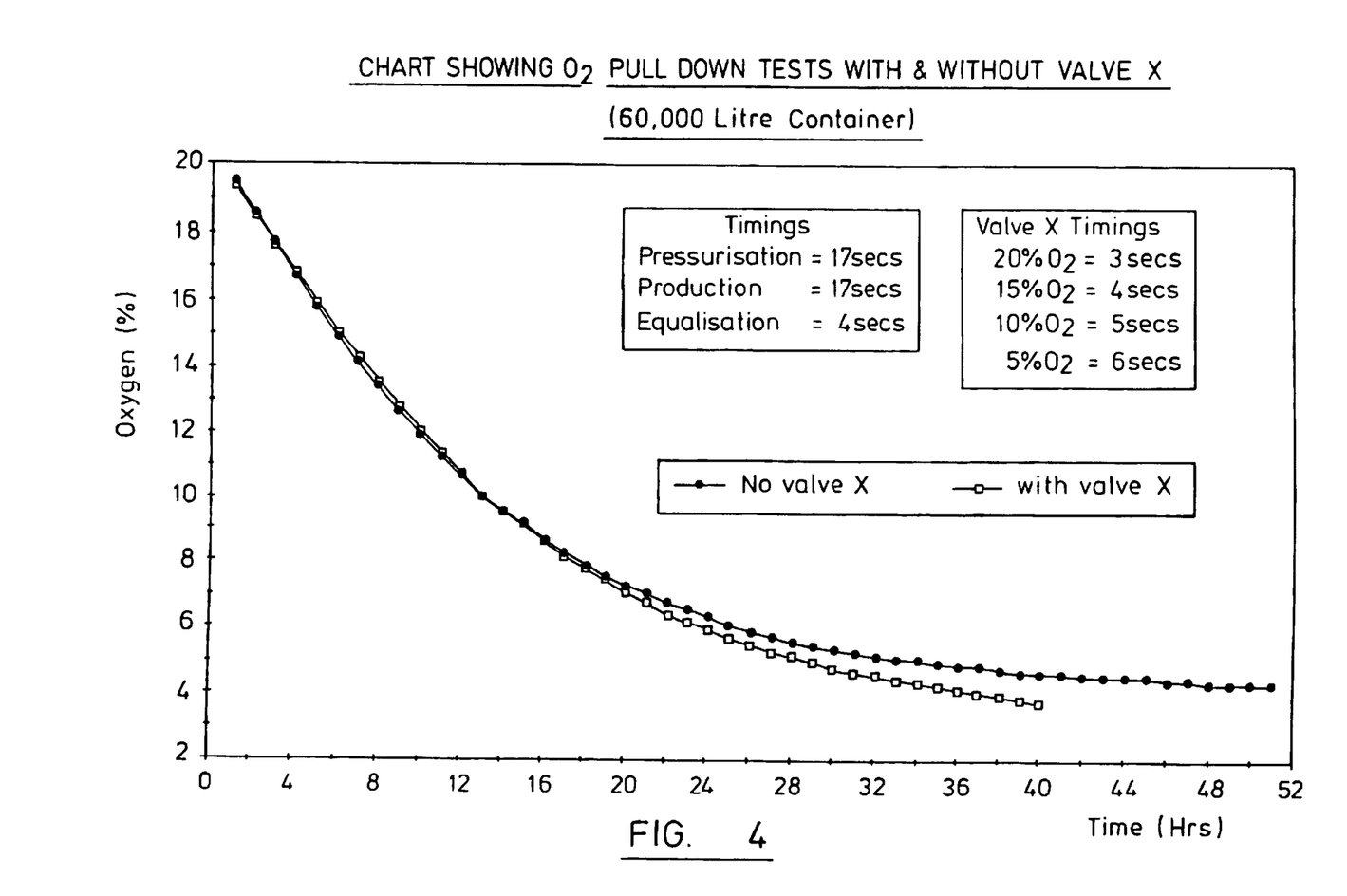
FIGS. 4 and 5 show test data from use of the apparatus of the invention to remove oxygen from a mixture of gases.

The tests were run until the level of oxygen in gas within the container was reduced to 4%. The results of the tests are shown in FIG. 4.

The data in the graph which is identified with "■" symbols were generated using the apparatus with the purge pulse of gas as described above. The data in the graph which is identified with "●" symbols were generated using the apparatus without the purge pulse. As can be seen, the oxygen content in the gas mixture reached 4% with the purge pulse after about 50 hours and continued to 3.6%. Without the purge pulse, the oxygen content could not be reduced below about 4.4%.

Figure 5:
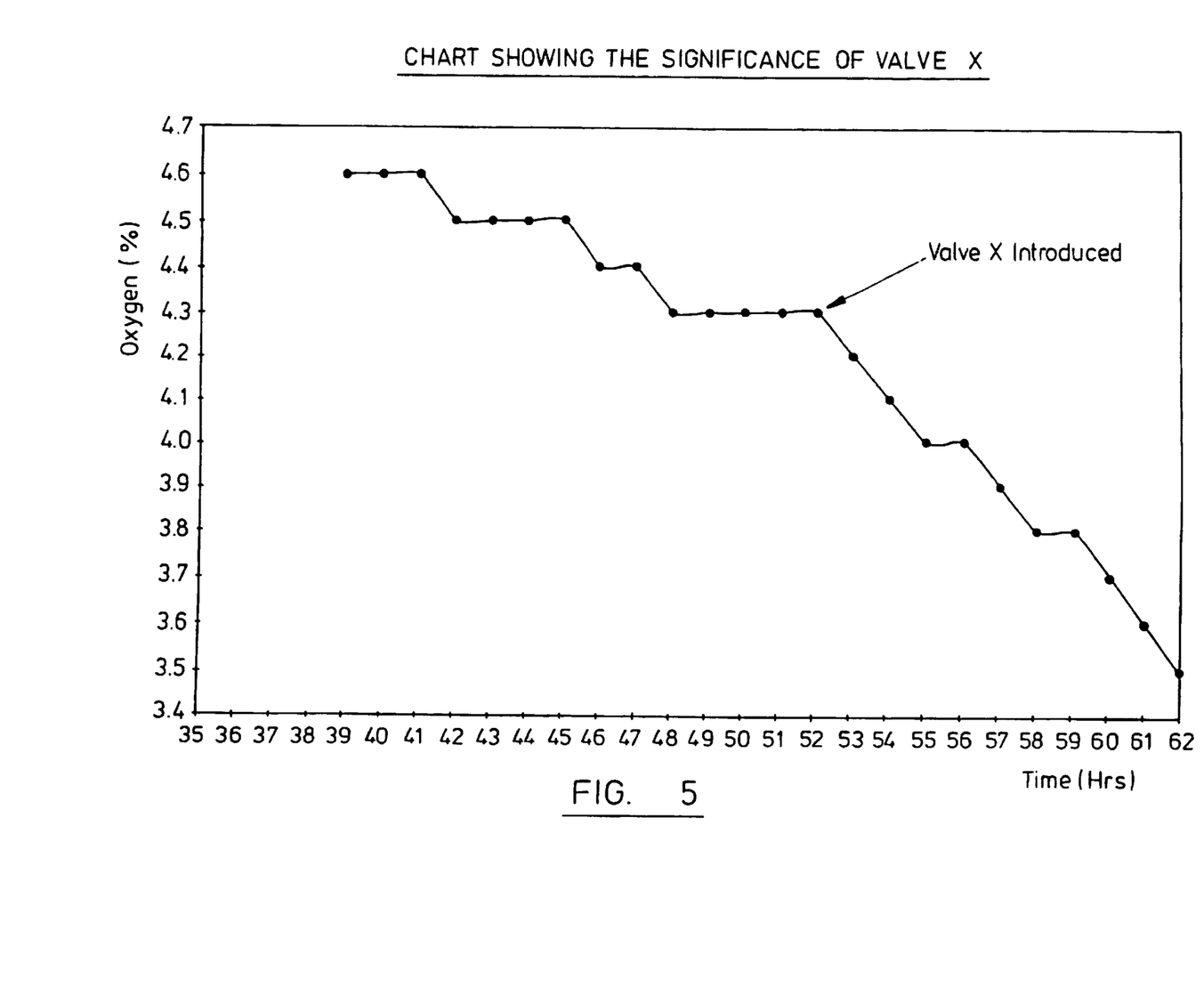

It has been found that the oxygen content can be reduced further after stabilisation of the oxygen content at 4.4% by starting to use the purge pulse regime. This is shown in FIG. 5.

What is claimed is:

1. A method of removing individual gas components of a mixture of gases within a controlled environment container using apparatus which comprises first and second chambers which are arranged in parallel for the gas mixture to flow through them from their inlet ends to their outlet ends and which contain adsorbent material with different affinities for the gas components of the mixture, the method comprising:

(a) supplying the gas mixture to the first chamber so as to pressurise it, while allowing a purge stream to flow from the outlet end of the first chamber to the second chamber to purge adsorbed gas from the adsorbent material in the second chamber, and (b) supplying a purge pulse of gas from the outlet end of the first chamber to the second chamber to purge adsorbed gas from the adsorbent material in the second chamber, the rate of flow of the purge stream being less than that of the purge pulse.

2. A method as claimed in claim 1, in which the purge stream flows from the outlet end of the first chamber to the second chamber substantially continuously while the pressure in the first chamber is greater than that in the second chamber.

3. A method as claimed in claim 1, which includes the step of venting the first chamber to atmosphere for a period of time to discharge preferentially the component of the gas mixture for which the affinity of the adsorbent is least strong.

4. A method as claimed in claim 3, in which the venting step takes place after the step of supplying a purge pulse of gas to the second chamber.

5. A method as claimed in claim 3, further comprising the step of controlling the period of time during which the first chamber is vented to atmosphere to optimise venting of the component of the gas mixture for which the affinity of the adsorbent is least strong and retention by the adsorbent of the component of the gas mixture for which the affinity of the adsorbent is most strong.

6. A method as claimed in claim 1, in which, while one or both of the purge pulse and the purge stream is supplied to the second chamber at its outlet end, purged gas is discharged from the second chamber at its inlet end.

7. A method as claimed in claim 6, in which the purged gas that is discharged from the second chamber is vented to the controlled environment container.

8. A method as claimed in claim 6, in which the purged gas that is discharged from the second chamber is vented to atmosphere.

9. A method as claimed in claim 1, which includes steps of equalizing the pressures in the chambers and repeating the steps (a) and (b) with the respective functions of the first and second chambers reversed.

10. A method for removing gas components from a gas mixture within a controlled environment container by utilizing an apparatus comprising a first chamber and a second chamber, the first and second chambers having an inlet end and an outlet end, the first and second chambers being arranged in parallel such that the gas mixture may flow through the first and second chambers from the inlet end to the outlet end of each chamber, the fist and second chambers also containing an adsorbent material having different affinities for the gas components of the gas mixture, the method comprising the steps of:

(a) supplying the gas mixture from the controlled environment container to the first chamber so as to pressurize the first chamber, while allowing a purge stream to flow from the outlet end of the first chamber to the second chamber to purge adsorbed gas from the adsorbent material in the second chamber;

(b) after passage of the purge stream from the first chamber to the second chamber, supplying a purge pulse of gas from the outlet end of the first chamber to the second chamber to purge adsorbed gas from the adsorbent material in the second chamber, the rate of flow of the purge stream being less than that of the purge pulse; and (c) equalizing the pressures in the chambers and repeating the steps (a) and (b) with the respective functions of the first and second chambers reversed.

11. A twin bed adsorption apparatus for selectively adsorbing components of a gas mixture, which comprises first and second chambers arranged in parallel for the gas mixture to flow through them from their inlet ends to their outlet ends and which contain adsorbent material with different affinities for the gas components of the mixture, each of the chambers having (i) an inlet port for the gas mixture at its inlet end, (ii) an outlet port at its outlet end for discharge of the component of the gas mixture for which the affinity of the adsorbent is least strong, (iii) a purge outlet port for gas that is supplied to the chamber to purge gas adsorbed by the adsorbent, the apparatus including:

(a) a purge stream conduit for providing a purge stream of gas between the chambers when their internal pressures are different, from the outlet end of the chamber with a higher internal pressure to the chamber with a lower internal pressure, and (b) a purge pulse conduit for providing a purge pulse of gas from the outlet end of the chamber with a higher internal pressure to the chamber with a lower internal pressure, the capacity of the purge pulse conduit being significantly greater than the capacity of the purge stream conduit.

12. Apparatus as claimed in claim 11, in which the ratio of the capacity of the purge pulse conduit to that of the purge stream conduit is at least about 1.5.

13. Apparatus claimed in claim 11, in which the purge outlet ports from the chambers are arranged so that the purge gas from the chambers can be directed to atmosphere or to a container from which the gas mixture is supplied to the apparatus.

14. Apparatus as claimed in claim 11, which includes means for controlling the period for which the chambers are vented to atmosphere at their outlet ends to optimize venting of the component of the gas mixture for which the affinity of the adsorbent is least strong and retention by the adsorbent of the component of the gas mixture for which the affinity of the adsorbent is most strong.

15. Apparatus as claimed in claim 11, further comprising a pressure equalization system comprising:

a conduit connecting the outlet end of the first chamber to the outlet end of the second chamber; and a two-way valve for allowing the internal pressures of the first chamber and the second chamber to equalize.

16. A twin bed adsorption apparatus for selectively adsorbing components of a gas mixture, comprising:

a first and second chamber each containing an adsorbent material with different affinities for the gas components of the mixture, each of the first and second chamber comprising:

an inlet end having an inlet port for receiving the gas mixture;

an outlet end having an outlet port for discharge of the component of the gas mixture for which the affinity of the corresponding adsorbent material is least strong, the first and second chamber being disposed in parallel so that the gas mixture flows from the inlet end to the outlet end of the first and second chamber, and a purge outlet port for gas that is supplied to the corresponding chamber to purge gas adsorbed by the adsorbent material;

at least one conduit extending between the first and second chamber for providing either a purge stream of gas or a purge pulse of gas when the internal pressures of the first and second chambers are not equal, the direction of either the purge stream of gas or the purge pulse of gas being from the chamber having a higher internal pressure to the chamber having a lower internal pressure; and a valve coupled with the at least one conduit that is selectively movable between a first and a second position for controlling the rate of flow of either the purge stream of gas or the purge pulse of gas through the at least one conduit.

17. A twin bed adsorption apparatus as defined in claim 16, wherein the at least one conduit comprises a first conduit extending between the first and second chambers for providing the purge stream of gas and a second conduit extending between the first and second chambers for providing the purge pulse of gas.

* * * * *

UNITED STATES PATENT AND TRADEMARK OFFICE
CERTIFICATE OF CORRECTION

PATENT NO.   : 6,344,070 B1
DATED        : February 5, 2002
INVENTOR(S)  : Robert Banks It is certified that error appears in the above-identified patent and that said Letters Patent is hereby corrected as shown below:

<u>Title page,</u>
Item [56], U.S. PATENT DOCUMENTS, change "5,968,223" to -- 5,968,233 --

<u>Column 2,</u>
Line 7, after "which can be" change "removed" to -- moved --
Line 19, before "ratio" insert -- said --

<u>Column 6,</u>
Line 24, before "about 5" change "upto" to -- up to --
Line 25, after "preferably" change "upto" to -- up to --

<u>Column 7,</u>
Line 40, after "preferably" change "upto" to -- up to --

<u>Column 9,</u>
Line 44, before "and second" change "fist" to -- first --

Signed and Sealed this

Eighteenth Day of February, 2003

JAMES E. ROGAN
*Director of the United States Patent and Trademark Office*